(12) United States Patent
Kuo et al.

(10) Patent No.: US 8,948,888 B2
(45) Date of Patent: Feb. 3, 2015

(54) HUMAN MACHINE INTERFACE DEVICE AND INTERFACE INTEGRATION METHOD THEREOF

(75) Inventors: Hsu-Yuan Kuo, Taoyuan Hsien (TW); Ching-Yang Wu, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 682 days.

(21) Appl. No.: 13/245,956

(22) Filed: Sep. 27, 2011

(65) Prior Publication Data

US 2012/0277885 A1 Nov. 1, 2012

(30) Foreign Application Priority Data

Apr. 29, 2011 (TW) .............................. 100115029 A

(51) Int. Cl.
*G05B 11/01* (2006.01)
*G05B 19/05* (2006.01)

(52) U.S. Cl.
CPC .... *G05B 19/056* (2013.01); *G05B 2219/13004* (2013.01)
USPC .............................................. 700/12; 700/11

(58) Field of Classification Search
USPC ...................................... 700/11, 12
See application file for complete search history.

(56) References Cited

U.S. PATENT DOCUMENTS

| | | | |
|---|---|---|---|
| 6,853,920 B2* | 2/2005 | Hsiung et al. ..................... 702/1 |
| 7,835,805 B2* | 11/2010 | Hood et al. ..................... 700/20 |
| 2003/0105535 A1* | 6/2003 | Rammler ........................ 700/17 |
| 2006/0288301 A1* | 12/2006 | Hood et al. ................... 715/762 |
| 2008/0082185 A1* | 4/2008 | Hood et al. ..................... 700/83 |
| 2008/0103751 A1* | 5/2008 | Hsiung et al. .................. 703/20 |
| 2009/0083204 A1* | 3/2009 | Baier et al. ..................... 706/45 |
| 2010/0050097 A1* | 2/2010 | McGreevy et al. ........... 715/762 |

* cited by examiner

*Primary Examiner* — Mohammad Ali
*Assistant Examiner* — Ziaul Karim
(74) *Attorney, Agent, or Firm* — Cantor Colburn LLP

(57) ABSTRACT

A human machine interface device and an interface integration method thereof are provided. The human machine interface device cooperates with a programmable logic controller. The programmable logic controller comprises a first program unit and a second program unit. The human machine interface device comprises a processor and a memory. The memory comprises a first address storing an operation variable and a second address storing a first common variable. The operation variable corresponds to the first logic operation via the first common variable. When the types and the amounts of the input/output parameters of the first program unit and the second program unit are the same, the processor causes the operation variable to correspond to the second program unit by updating the first common variable into a second common variable.

8 Claims, 3 Drawing Sheets

HUMAN MACHINE INTERFACE DEVICE AND INTERFACE INTEGRATION METHOD THEREOF

This application claims priority to Taiwan Patent Application No. 100115029 filed on Apr. 29, 2011, which is hereby incorporated by reference in its entirety.

CROSS-REFERENCES TO RELATED APPLICATIONS

Not applicable.

BACKGROUND OF THE INVENTION

1. Field of the Invention

The present invention relates to a human machine interface (HMI) device and an interface integration method thereof. More particularly, the HMI device and the interface integration method thereof of the present invention use an interface-oriented mechanism to establish a correspondence relation with a programmable logic controller (PLC).

2. Descriptions of the Related Art

A typical automatic control system mainly comprises two blocks: a programmable logic controller (PLC) and a human machine interface (HMI) device. Specifically, the PLC is mainly responsible for the execution of logic programs, including logic operations, operations of a counter and a timer, data input and output (I/O) and the like. A logic program may be a set of program codes, a function or a modularized functional block. Generally, various variants of logic programs are collectively termed as program units. On the other hand, the HMI device is mainly responsible for planning of an operation screen, and can be used to arrange buttons, images, charts, sampling and alarming components and the like in the screen so that a user can operate and design the system via the HMI device.

In practice, the HMI device focuses on operational convenience for the user, so it must provide a user-friendly interface for the user to compose and design the frames; on the other hand, the PLC mainly focuses on the programming and execution of logic programs. Accordingly, most automatic control system suppliers design a compiler specific to the HMI device and a compiler specific to the PLC separately. Because of the different compilers, the program units of the PLC and the interface of the HMI device must be designed separately.

In a conventional automatic control system, the PLC and the HMI device communicate with each other mainly through common variables defined therebetween and via a physical connection such as a serial port, an Ethernet or a wireless bus according to a user-defined communication protocol.

However, the complexity in interaction between the HMI device and the program units of the PLC increases correspondingly when the number of program units increases with the enlargement of the automatic control system architecture. Thus, the common variables are necessary to be defined with more complexity, which further add the burden to the user. Moreover, since there is not an adjustable flexibility in correspondence to the variables between the conventional HMI device and the program units of the PLC, it is difficult to modify corresponding variables of the HMI device when different program units are added or modified.

In view of this, efforts still have to be made in the art to overcome the shortcoming of the conventional HMI device; that is, in the prior art, it is difficult to modify variables of the HMI device because of a complicated correlation between the variables of the HMI device and the program units of the PLC.

SUMMARY OF THE INVENTION

An objective of the present invention is to provide a human machine interface (HMI) device and an interface integration method thereof, which establish a correspondence relation with the program units of a programmable logic controller (PLC) from the standpoint of an architectural interface design. By directly using an interface-oriented mechanism to establish a correspondence relation of the common variables, the correspondence relations of variables between the HMI device and the program units of the PLC can be simplified.

To achieve the aforesaid objective, the present invention provides an interface integration method for use in an HMI device. The HMI device cooperates with a PLC. The PLC comprises a first program unit and a second program unit. The first program unit is capable of executing a first logical operation stored in a first entity location, and the second program unit is capable of executing a second logical operation stored in a second entity location. The interface integration method comprises the following steps: (a) declaring an operation variable; (b) storing the operation variable into a first address of a memory; (c) defining a first common variable according to a entity information of the first program unit and storing the first common variable into a second address of the memory, wherein there is a correspondence relation between the second address and the first address of the memory; (d) instructing the operation variable to correspond to the first entity location according to the correspondence relation and the first common variable; (e) defining a second common variable according to entity information of the second program unit; and (f) replacing the first common variable with the second common variable in the second address of the memory and instructing the operation variable to correspond to the second entity location according to the correspondence relation and the second common variable, wherein types and amounts of input/output parameters of the first program unit and the second program unit are the same.

To achieve the aforesaid objective, the present invention further provides an HMI device. The HMI device cooperates with a PLC. The PLC comprises a first program unit and a second program unit. The first program unit is capable of executing a first logical operation stored in a first entity location, and the second program unit is capable of executing a second logical operation stored in a second entity location. The HMI device comprises a processor and a memory. The memory comprises a first address and a second address, and there is a correspondence relation between the first address and the second address. The processor, which is electrically connected to the memory, is configured to do the following: to declare an operation variable to store the operation variable into the first address of the memory; to define a first common variable according to entity information of the first program unit; to store the first common variable into the second address of the memory; to instruct the operation variable to correspond to the first entity location where the first program unit executes the first logical operation according to the correspondence relation and the first common variable; to define a second common variable according to entity information of the second program unit; to replace the first common variable with the second common variable in the second address of the memory; and to instruct the operation variable to correspond to the second entity location where the second program unit executes the second logical operation according to the correspondence relation the second common variable, wherein types and amounts of input/output parameters of the first program unit and the second program unit are the same.

With the technical features disclosed above, the HMI device and the interface integration method thereof of the present invention can effectively overcome the shortcoming of the prior art in that it was difficult to modify variables of the HMI device because the correspondence relation of the variables between the HMI device and the program units of the PLC lacked adjustable flexibility.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. It shall be appreciated that these embodiments are not intended to limit the present invention to any specific environment, applications or particular implementations described in these embodiments. Therefore, the description of these embodiments is only for the purpose of illustration rather than to limit the present invention, and the scope claimed by this application shall be governed by the claims. In the following embodiments and the attached drawings, elements not directly related to the present invention are omitted from depiction; and dimensional relationships among individual elements in the attached drawings are illustrated only for ease of understanding but not to limit the actual scale.

Figure 1A:
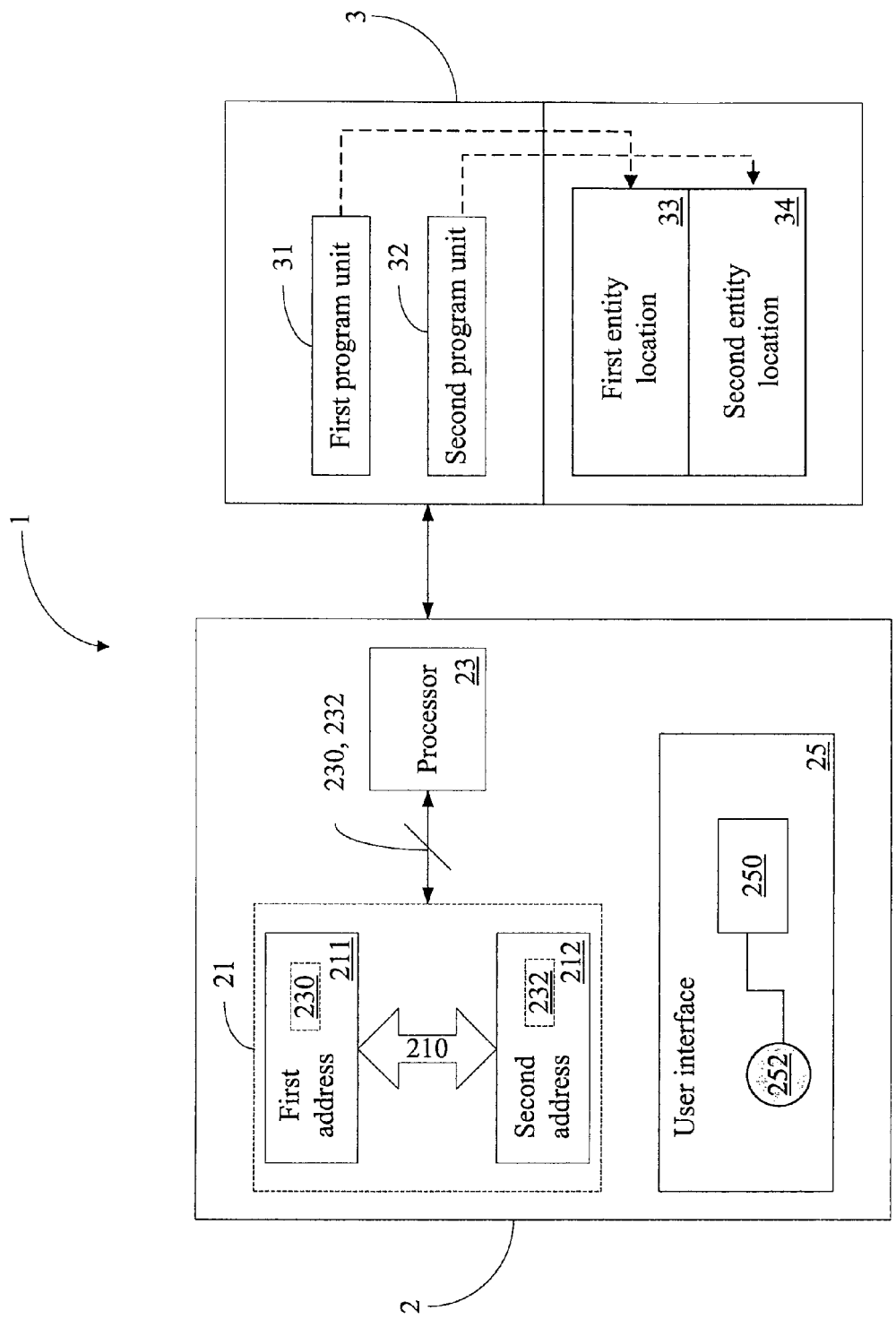
FIG. 1A and FIG. 1B are schematic views of the first embodiment of the present invention.

FIG. 1A illustrates a schematic view of an automatic control system 1 according to the first embodiment of the present invention. The automatic control system 1 comprises a human machine interface (HMI) device 2 and a programmable logic controller (PLC) 3. As shown, the HMI device 2 and the PLC 3 cooperate with each other via a connection therebetween. The HMI device 2 comprises a memory 21, a processor 23 and a user interface 25. The memory 21 comprises a plurality of addresses, including at least a first address 211 and a second address 212.

On the other hand, the PLC 3 comprises a plurality of program units, including at least a first program unit 31 and a second program unit 32. The first program unit 31 is configured to execute a first logical operation stored in a first entity location 33. The second program unit 32 is configured to execute a second logical operation stored in a second entity location 34. In other words, the first program unit 31 mainly corresponds to the first logical operation in the first entity location 33, while the second program unit 32 mainly corresponds to the second logical operation in the second entity location 34. It shall be particularly appreciated that the method in which a signal is transmitted between the HMI device 2 and the PLC 3 as well as the essential correlation therebetween can be readily known by those of ordinary skill in the art, and thus will not be further described herein. The functions of and interactions between the elements will be detailed in the following description.

Referring to FIG. 1A, the processor 23 of the HMI device 2 firstly declares an operation variable 230. In detail, the processor 23 declares the operation variable 230 according to a type of the first program unit 31 of the PLC 3 to make a type of the operation variable 230 identical to that of the first program unit 31. For example, assuming that the type of the first program unit 31 is an add operation with two input real parameters X and Y and one output real parameter Z (i.e., Z=X+Y), then the type of the operation variable 230 declared according to the type of the first program unit 31 is also an add operation with two input real parameters X and Y and one output real parameter Z.

It shall be particularly emphasized that the processor 23 may also declare the operation variable 230 according to a user-defined type. For example, assuming that the user-defined type is a multiply operation with two input real parameters A and B and one output real parameter C (i.e., C=A×B), then the type of the operation variable 230 declared according to the user-defined type is also a multiply operation with two input real parameters A and B and one output real parameter C. In the present invention, the type of the operation variable declared is not merely limited to be identical to that of the program unit, and the operation variable may also be declared according to a user-defined type.

Next, the processor 23 of the HMI device 2 stores the operation variable 230 into the first address 211 of the memory 21. The processor 23 further defines a first common variable 232 according to entity information (not shown) of the first program unit 31, and stores the first common variable 232 into the second address 212 of the memory 21. There is a correspondence relation 210 between the second address 212 and the first address 211 of the memory 21. Thus, according to the correspondence relation 210 and the first common variable 232 related to the first program unit 31, the processor 23 can instruct the operation variable 230 to correspond to the first entity location 33 where the first program unit 31 executes the first logical operation.

Specifically, the entity information of the first program unit 31 comprises the first entity location 33 where the first program unit 31 executes the first logical operation, an accessing mode and other related information, and may be an index of a physical correlation between the HMI device 2 and the first program unit 31 of the PLC 3. Furthermore, the correspondence relation 210 between the second address 212 and the first address 211 of the memory 21 represents that the operation variable 230 stored in the first address 211 can retrieve information related to the first common variable 232 stored in the second address 212; thereby, the processor 23 can instruct the operation variable 230 to correspond to the first entity location 33 where the first program unit 31 executes the first logical operation according to the correspondence relation 210 and contents of the first common variable 232.

For example, when the operation variable 230 is stored in the first address 211 of the memory 21 and the first common variable 232 is stored in the second address 212 of the memory 21, the operation variable 230 can be linked to the related information (i.e., the first entity location 33 where the first program unit 31 executes the first logical operation, an accessing mode and other related information) of the first common variable 232 according to the correspondence relation 210 between the first address 211 and the second address 212 of the memory 21. Thereby, the operation variable 230 is instructed to correspond to the first entity location 33 where the first program unit 31 of the PLC 3 executes the first logical operation so that the execution content of the operation variable 230 is identical to the first logical operation executed by the first program unit 31 in the entity.

It shall be particularly appreciated that the method in which the operation variable 230 of the HMI device 2 establishes the physical correlation with the first program unit 31 of the PLC 3 according to the entity information of the first program unit 31 will be readily known by those of ordinary skill in the art, and thus will not be further described herein.

Figure 1B:
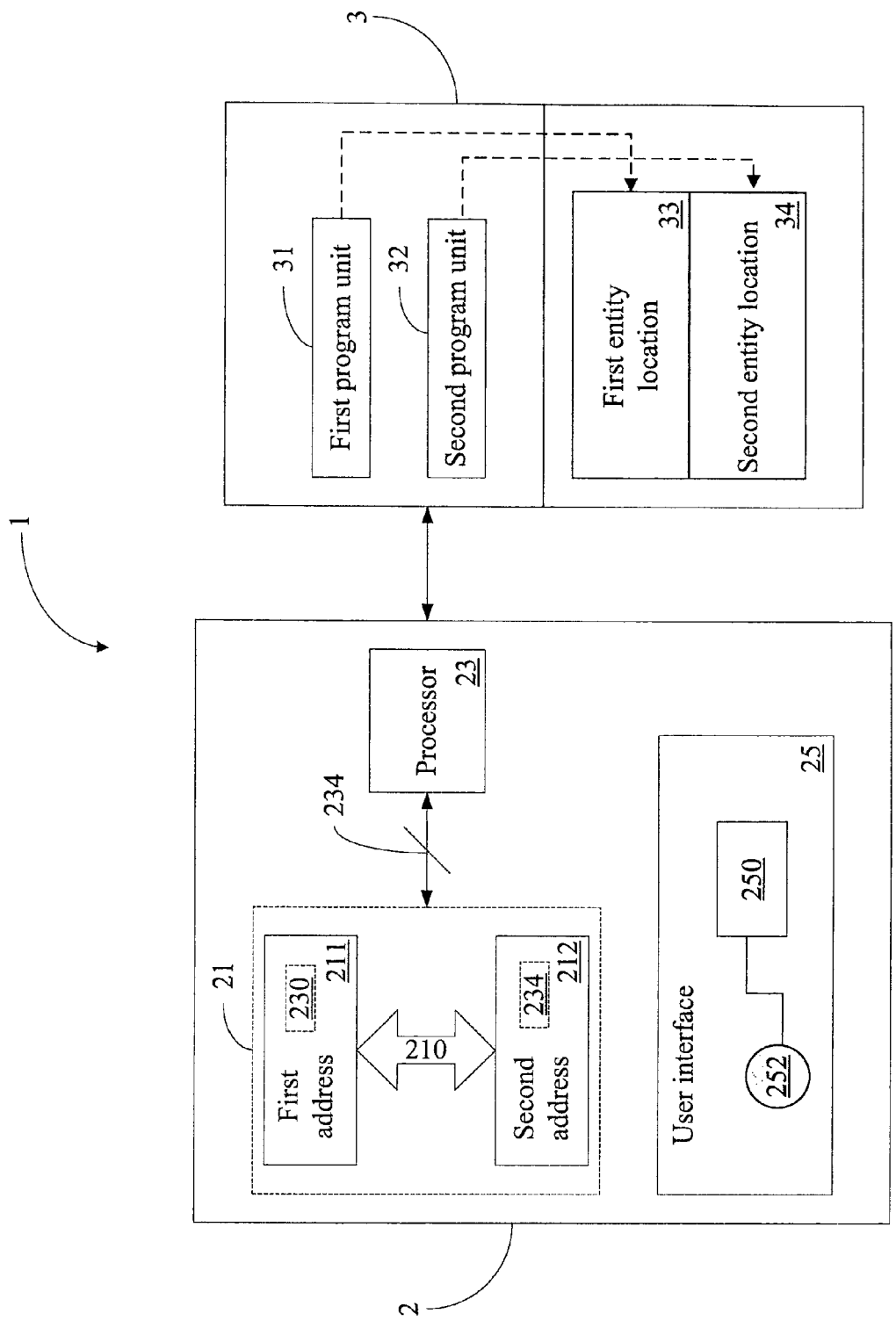

The method in which the correspondence relation between the variables of the HMI device 2 and the program units of the PLC 3 is modified will be described hereinafter. Specifically, in reference to FIG. 1B, the processor 23 of the HMI device 2 defines a second common variable 234 according to entity information of the second program unit 32. Similarly, the second common variable 234 comprises the entity location where the second program unit 32 executes the second logical operation, an accessing mode and other related information.

Then, the processor 23 of the HMI device 2 replaces the first common variable 232 with the second common variable 234 in the second address 212 of the memory 21, and according to the correspondence relation 210 between the first address 211 and the second address 212 of the memory 21, instructs the operation variable 230 to correspond to the second entity location 34 where the second program unit 32 executes the second logical operation. It shall be particularly emphasized that types and amounts of input/output parameters of the first program unit 31 and the second program unit 32 are the same.

Furthermore, the HMI device 2 of the present invention directly uses an interface-oriented mechanism to establish the correspondence relation between the variables of the HMI device 2 and the program units of the PLC 3. Therefore, under conditions that the types and the amounts of the input/output parameters of the first program unit 31 and the second program unit 32 are the same, by simply updating the first common variable 232 in the second address 212 of the memory 21 into the second common variable 234, the user can instruct the operation variable 230 of the HMI device 2 to correspond to the second entity location 234 where the second program unit 32 executes the second logical operation instead of corresponding to the first entity location 33 where the first program unit 31 of the PLC 3 executes the first logical operation according to the correspondence relation 210 between the first address 211 and the second address 212 of the memory 21. This eliminates the need of a complex process of replacing and even re-defining the operation variable.

As an example, assume that the first program unit 31 is an add operation with two input real parameters X and Y and one output real parameter Z, the second program unit 32 is a multiply operation with two input real parameters A and B and one output real parameter C, the operation variable 230 is stored in the first address 211 of the memory 21 and the first common variable 232 is stored in the second address 212 of the memory 21. Then, because both the amounts and the types of input/output parameters of the first program unit 31 and the second program unit 32 are the same (i.e., they both have two input parameters and one output parameter and the input/output parameters are all real numbers), the user can instruct the operation variable 230 of the HMI device 2 to correspond to the second entity location 34 where the second program unit 32 executes the multiply operation instead of corresponding to the first entity location 33 where the first program unit 31 of the PLC 3 executes the add operation by simply updating the first common variable 232 in the second address 212 of the memory 21 into the second common variable 234.

As another example, assume that both the first program unit 31 and the second program unit 32 are an add operation with two input real parameters X and Y and one output real parameter Z, the first program unit 31 and the second program unit 32 execute the add operation in different entity locations, the operation variable 230 is stored in the first address 211 of the memory 21 and the first common variable 232 is stored in the second address 212 of the memory 21. Then, because the amounts and the types of input/output parameters of the first program unit 31 and the second program unit 32 are the same, the user can instruct the operation variable 230 of the HMI device 2 to correspond to the second entity location 34 where the second program unit 32 executes the add operation instead of corresponding to the first entity location 33 where the first program unit 31 of the PLC 3 executes the add operation by simply updating the first common variable 232 in the second address 212 of the memory 21 into the second common variable 234. The aforesaid add operations are executed in different entity locations.

It shall be particularly appreciated that the correspondence relation of the common variables in the memory can be implemented by a table in this embodiment. In detail, the processor 23 of the HMI device 2 can generate a correspondence relation recording table in the memory 21 to record the correspondence relation of the variables in the memory 21. Furthermore, the correspondence relation recording table may have a first field and a second field, which correspond to the first address 211 and the second address 212 of the memory 21 respectively. Thus, according to contents of the correspondence relation recording table, the user can access the variables in the memory 21, e.g., store the operation variable 230 into the first address 211 of the memory 21, can store the first common variable 232 into the second address 212 of the memory 21 and can replace the first common variable 232 with the second common variable 234.

In addition, in this embodiment, a Boolean value of a parameter of the operation variable 230 may also be adjusted, and the parameter is one of a visible and a read-only parameter. Specifically, the processor 23 of the HMI device 2 can generate an operation variable table in the memory 21 so that the user can set an attribute limitation of the operation variable 230 accordingly. If the Boolean value of the visible parameter of the operation variable 230 is set to be "True", then the operation variable 230 is a visible variable; otherwise, if the Boolean value of the visible parameter of the operation variable 230 is set to be "False", then the operation variable 230 is an invisible variable. Similarly, whether the operation variable 230 is read only or not can be determined by setting the Boolean value of the read-only parameter of the operation variable 230. It shall be appreciated that the visible parameter and the read-only parameter are not intended to limit the present invention; and in other embodiments, the user may set other parameters of the operation variable 230.

Furthermore, this embodiment allows the user to configure the operation variable 230 by building an operation variable element 250. In detail, the processor 23 of the HMI device 2 can build an operation variable element 250 in a user interface 25 according to the operation variable 230, and the operation variable element 250 corresponds to all the properties of the operation variable 230. For example, assuming that the type of the operation variable 230 is an add operation with two input real parameters X and Y and one output real parameter Z, then the operation variable element 250 is a frame element with the two input real parameters X and Y and the one output real parameter Z and corresponds to the function of the add operation.

Specifically, based on the operation variable element 250 generated according to the operation variable 230, the user can connect the operation variable element 250 to at least one configuration element 252 and operate the operation variable 230 via the operation variable element 250 in the user interface 25. In detail, the processor 23 of the HMI device 2 can build an element window, an element attribute window and an editing window in the user interface 25. The element window comprises operation variable elements 250 built according to operation variables 230 and various configuration elements of the HMI device, which include but are not limited to buttons, switches, testing elements and sampling elements. The element attribute window comprises attributes of all the elements in the element window, which include but are not limited to the types of the elements, storage addresses of the elements and the like. The editing window may serve as an editing platform, which is used by the user to visually edit the connection between the operation variable element 250 and the at least one configuration element 252 and to build a parameter interface connection relation between the elements by performing interface integration on the operation variable 230 and the at least one configuration element 252 of the HMI device.

Figure 2:
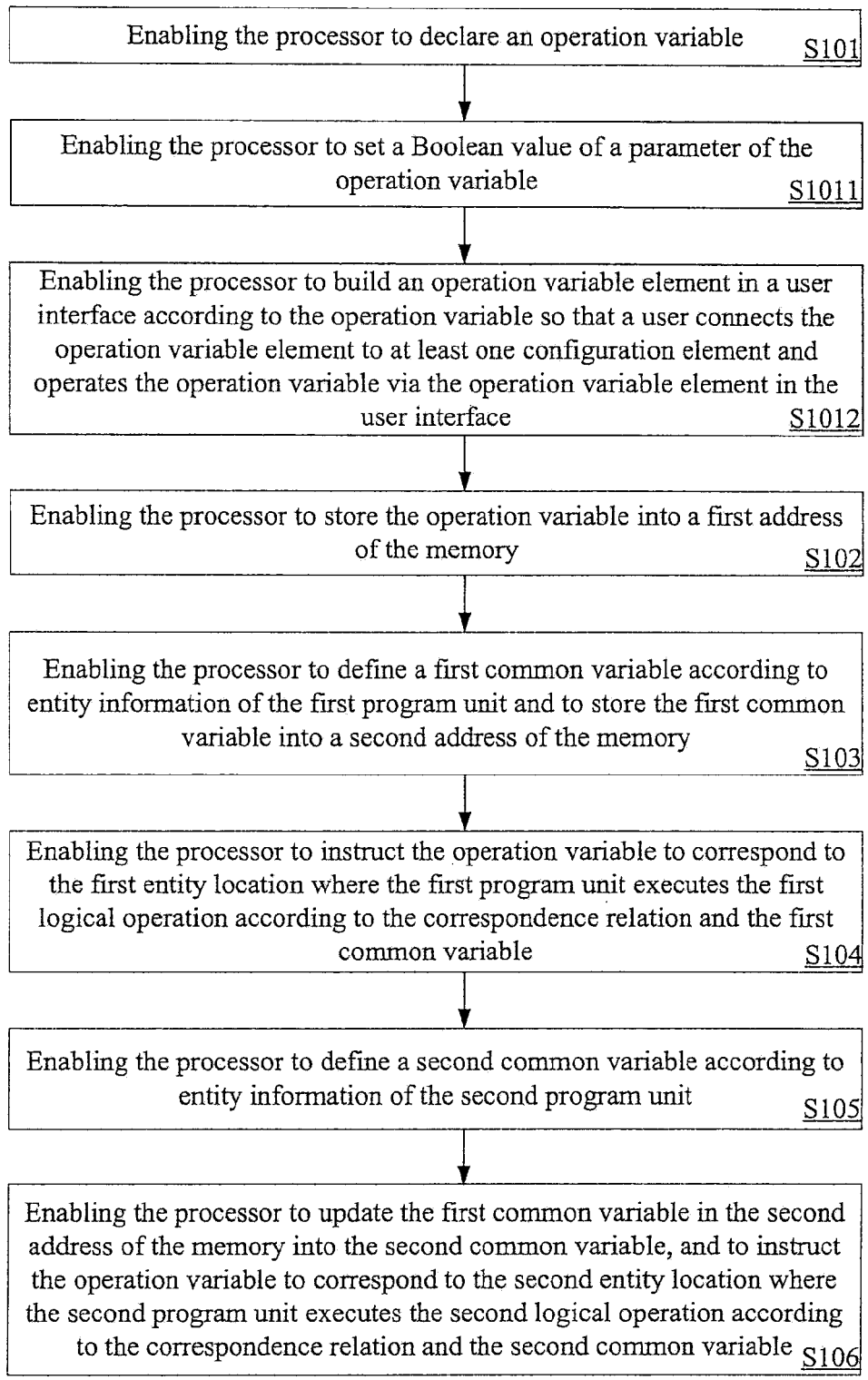
FIG. 2 is a flowchart of an interface integration method according to the second embodiment of the present invention.

The second embodiment of the present invention is an interface integration method, a flowchart of which is shown in FIG. 2. The interface integration method of the second embodiment is for use in an HMI device (e.g., the HMI device 2 described in the first embodiment). The HMI device cooperates with a PLC. The HMI device comprises a memory and a processor. The PLC comprises a first program unit and a second program unit. The first program unit is capable of executing a first logical operation stored in a first entity location, and the second program unit is capable of executing a second logical operation stored in a second entity location. The interface integration method comprises the following steps.

At first, step S101 is executed to enable the processor to declare an operation variable. Then, step S1011 is executed to enable the processor to set a Boolean value of a parameter of the operation variable, wherein the parameter is one of a visible parameter and a read-only parameter. Step S1012 is executed to enable the processor to build an operation variable element in a user interface according to the operation variable so that a user connects the operation variable element to at least one configuration element and operates the operation variable via the operation variable element in the user interface.

In the second embodiment, related details and contents of the execution of the step S1011 and the step S1012 are identical to those described in the corresponding paragraphs of the first embodiment, and thus will not be further described herein. However, it shall be particularly emphasized that the order in which the step S1011 and the step S1012 are executed is not intended to limit the present invention. That is, in other embodiments, the step S1011 and the step S1012 may be exchanged in terms of the execution order or may be executed after other steps, the purpose of which will be readily appreciated by people skilled in the art.

Next, step S102 is executed to store the operation variable into a first address of the memory. Step S103 is executed to enable the processor to define a first common variable according to entity information of the first program unit and to store the first common variable into a second address of the memory. There is a correspondence relation between the first address and the second address.

Then, step S104 is executed to enable the processor to instruct the operation variable to correspond to the first entity location where the first program unit executes the first logical operation according to the correspondence relation and the first common variable. It shall be appreciated that the method in which the processor instructs the operation variable to correspond to the first entity location where the first program unit executes the first logical operation according to the correspondence relation and the first common variable is identical to what has been described in the first embodiment, and thus will not be further described.

Similarly, step S105 is executed to enable the processor to define a second common variable according to entity information of the second program unit. Step S106 is executed to enable the processor to replace the first common variable with the second common variable in the second address of the memory, and to instruct the operation variable to correspond to the second entity location where the second program unit executes the second logical operation according to the correspondence relation between the first address and the second address of the memory and the second common variable. The types and the amounts of the input/output parameters of the first program unit and the second program unit are the same.

The method in which the processor instructs the operation variable to correspond to the second entity location, in which the second program unit executes the second logical operation instead of corresponding to the first entity location where the first program unit of the PLC executes the first logical operation, is also identical to what has been described in the first embodiment, and thus will not be further described either.

In this embodiment, the correspondence relation of the common variables in the memory can also be implemented by a table. In detail, the processor can generate a correspondence relation recording table in the memory to record the correspondence relation of the variables in the memory. Furthermore, the correspondence relation recording table may have a first field and a second field, which correspond to the first address and the second address of the memory respectively. Thereby, according to the contents of the correspondence relation recording table, the user can access the variables in the memory, e.g., store the operation variable into the first address of the memory, store the first common variable into the second address of the memory and replace the first common variable with the second common variable.

According to the above descriptions, the HMI device and the interface integration method thereof of the present invention establish a correspondence relation with program units of the PLC from the standpoint of architectural interface design. By directly using an interface-oriented mechanism to establish a correspondence relation between the variables of the HMI device and the program units of the PLC, the correspondence relation can be simplified. Therefore, the HMI device and the interface integration method thereof of the present invention can effectively overcome the shortcoming of the prior art, in which it was difficult to modify the variables of the HMI device because the correspondence relation between the variables of the HMI device and the program units of the PLC lacked adjustable flexibility.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An interface integration method for use in a human machine interface (HMI) device, the HMI device comprising a processor and a memory, the HMI device cooperating with a programmable logic controller (PLC), the PLC comprising a first program unit and a second program unit, the first program unit being capable of executing a first logical operation stored in a first entity location and the second program unit being capable of executing a second logical operation stored in a second entity location, the interface integration method comprising the following steps of:

(a) declaring an operation variable by the processor;
(a1) building an operation variable element in a user interface according to the operation variable so that a user connects the operation variable element to at least one configuration element and operates the operation variable via the operation variable element in the user interface;
(b) storing the operation variable into a first address of the memory by the processor;
(c) defining a first common variable according to entity information of the first program unit and storing the first common variable into a second address of the memory by the processor, wherein there is a correspondence relation between the second address and the first address of the memory;
(d) instructing the operation variable to correspond to the first entity location according to the correspondence relation and the first common variable by the processor;
(e) defining a second common variable according to entity information of the second program unit by the processor; and
(f) replacing the first common variable with the second common variable in the second address of the memory and instructing the operation variable to correspond to the second entity location according to the correspondence relation and the second common variable by the processor, wherein types and amounts of input/output parameters of the first program unit are the same as those of the second program unit.

2. The interface integration method as claimed in claim 1, wherein declaring the operation variable is according to a type of the first program unit.

3. The interface integration method as claimed in claim 1, wherein declaring the operation variable is according to a user-defined type.

4. The interface integration method as claimed in claim 1, further comprising the following step after the step (a):
(a1) setting a Boolean value of a parameter of the operation variable, wherein the parameter is one of a visible parameter and a read-only parameter.

5. An HMI device, cooperating with a PLC, the PLC comprising a first program unit and a second program unit, the first program unit being capable of executing a first logical operation stored in a first entity location and the second program unit being capable of executing a second logical operation stored in a second entity location, the HMI device comprising:

a memory, comprising a first address and a second address, and there being a correspondence relation between the second address and the first address; and
a processor electrically connected to the memory, being configured to declare an operation variable, to store the operation variable into the first address of the memory, to define a first common variable according to entity information of the first program unit, to store the first common variable into the second address of the memory, to instruct the operation variable to correspond to the first entity location where the first program unit executes the first logical operation according to the correspondence relation and the first common variable, to define a second common variable according to entity information of the second program unit, to replace the first common variable with the second common variable in the second address of the memory, and to instruct the operation variable to correspond to the second entity location where the second program unit executes the second logical operation according to the correspondence relation and the second common variable, wherein types and amounts of input/output parameters of the first program unit are the same as those of the second program unit; and
a user interface module, being configured to provide a user interface;
wherein the processor is further configured to build an operation variable element in the user interface according to the operation variable so that a user connects the operation variable element to at least one configuration element, and operates the operation variable via the operation variable element in the user interface.

6. The HMI device as claimed in claim 5, wherein the processor declares the operation variable according to a type of the first program unit.

7. The HMI device as claimed in claim 5, wherein the processor declares the operation variable according to a user-defined type.

8. The HMI device as claimed in claim 5, wherein the processor is further configured to set a Boolean value of a parameter of the operation variable, and the parameter is one of a visible parameter and a read-only parameter.

* * * * *